(12) United States Patent
Kilgore (10) Patent No.: US 9,103,328 B1
(45) Date of Patent: Aug. 11, 2015

(54) MAGNIFIED SOLAR ENERGY GENERATOR

(71) Applicant: Richard D Kilgore, Alabaster, AL (US)

(72) Inventor: Richard D Kilgore, Alabaster, AL (US)

( * ) Notice: Subject to any disclaimer, the term of this patent is extended or adjusted under 35 U.S.C. 154(b) by 22 days.

(21) Appl. No.: 14/036,640

(22) Filed: Sep. 25, 2013

Related U.S. Application Data (63) Continuation-in-part of application No. 13/136,879, filed on Aug. 15, 2011, now abandoned.

(51) Int. Cl.
| | | |
|---|---|---|
| *F03G 6/00* | (2006.01) | |
| *F03G 7/00* | (2006.01) | |
| *F03G 6/06* | (2006.01) | |
| *F24J 2/04* | (2006.01) | |
| *F24J 2/06* | (2006.01) | |
| *F24J 2/24* | (2006.01) | |

(52) U.S. Cl.
CPC ............... *F03G 6/065* (2013.01); *F03G 6/003* (2013.01); *F24J 2/04* (2013.01); *F24J 2/06* (2013.01); *F24J 2/24* (2013.01); *Y02E 10/44* (2013.01); *Y02E 10/46* (2013.01)

(58) Field of Classification Search
CPC ............ F03G 6/065; F03G 6/003; F24J 2/24; F24J 2/06; F24J 2/04; Y02E 10/46; Y02E 10/44
USPC ........................................... 60/641.8–641.15
See application file for complete search history.

(56) References Cited

U.S. PATENT DOCUMENTS

| | | | |
|---|---|---|---|
| 4,043,315 A | 8/1977 | Cooper | |
| 4,055,948 A | 11/1977 | Kraus et al. | |
| 4,449,515 A | 5/1984 | Nilsson, Sr. | |
| 4,513,731 A * | 4/1985 | Campbell | 126/646 |
| 5,575,860 A | 11/1996 | Cherney | |
| 5,775,107 A * | 7/1998 | Sparkman | 60/641.8 |
| 6,360,542 B1 | 3/2002 | Luo | |
| 7,821,147 B2 | 10/2010 | Du Bois | |
| 7,898,212 B2 | 3/2011 | Benn et al. | |
| 7,938,615 B2 | 5/2011 | Michaud | |
| 7,969,133 B2 | 6/2011 | Zhaug et al. | |
| 7,969,735 B2 | 6/2011 | Nakatsu | |
| 2003/0033805 A1 | 2/2003 | LaViolette | |
| 2007/0137641 A1* | 6/2007 | Brown | 126/623 |
| 2008/0001059 A1* | 1/2008 | Wang | 250/203.4 |
| 2010/0244449 A1 | 9/2010 | Lee | |
| 2012/0222421 A1 | 9/2012 | Hanna | |
| 2013/0081396 A1* | 4/2013 | Kuo | 60/641.8 |

* cited by examiner

*Primary Examiner* — Hoang Nguyen
(74) *Attorney, Agent, or Firm* — George L Williamson (57) ABSTRACT

Method and apparatus for a solar energy generating system to provide electricity to a structure ranging from a single family dwelling to multi-unit dwellings to commercial buildings, or a power plant or power grid. The system includes a solar collector having a magnifying lens to direct and focus sun rays to a solar energy collector, a heat transfer unit, boiler, a water heater backup system, a condenser unit and steam engine, and plural electrical energy storage units to store and dispense electricity to the selected type of electricity user.

14 Claims, 6 Drawing Sheets

MAGNIFIED SOLAR ENERGY GENERATOR

RELATED APPLICATIONS

This application is a continuation-in-part of U.S. patent application Ser. No. 13/136,879 dated Aug. 15, 2011.

BACKGROUND OF THE INVENTION

1. Field of the Invention

The present invention relates generally to solar energy generating systems and, more particularly, is concerned with a solar energy generator that incorporates a plurality of unique components to more efficiently produce cost effective electricity.

2. Description of the Related Art

The present invention relates to a magnified solar generator system offering improved efficiency by the use of a combination of components unique to the solar production of electricity. The system of this invention has particular utility to residential building structures where the preferred system is suited best for single family homes. Notwithstanding the preferred application, it will be understood that the system hereof is also suitable to multi-unit structures, commercial buildings and new or existing power plants, thus, the applicability of the system is quite broad.

While the known commercial and published patents reveal a number of systems for producing solar energy, none teach a system as unique as the one herein described. Examples of such published patents are set forth below.

In U.S. Pat. No. 6,360,542, dated Mar. 26, 2002, Luo, disclosed an apparatus for converting solar energy into electrical energy and included a solar energy collecting device for collecting light energy from the sun, and a tank for holding water therein. The tank is held in place with respect to the solar energy collecting device to enable the solar energy collecting device to direct the light energy collected thereby to the tank, to increase the temperature of the tank for converting the water in the tank into steam.

In U.S. Pat. No. 7,821,147, dated Oct. 26, 2010, Du Bois disclosed a portable, towable, buoyant hybrid renewable energy platform for producing and storing electrical energy using wind, water, and solar power, or a combination thereof. Included on this platform is a wind turbine that semi detaches to become a water turbine, if necessary. A small, fuel backup generator is provided for, as is a system for air portage and stabilizing the device.

In U.S. Pat. No. 7,898,212, dated Mar. 1, 2011, Benn, et al., disclosed a portable PV modular solar generator. A plurality of wheels is attached to the bottom of a rechargeable batter container. At least one rechargeable battery is contained inside the rechargeable batter container. A power conditioning panel is connected to the rechargeable battery container. At least one rechargeable battery is contained inside the rechargeable battery container. A power conditioning panel is connected to the rechargeable battery container. At least one photovoltaic panel is pivotally connected. In a preferred embodiment, the rechargeable battery container is a waterproof battery enclosure having a knife switch connection. A mast having a rotation bar is supported by the waterproof battery enclosure. At least one solar panel support brace for supporting the photovoltaic panel is attached to the rotation bar. The power conditioning panel is waterproof, is attached to the mast and has a door. When the door is opened, at least one safety switch is opened, breaking an electric circuit. The waterproof power conditioning panel has a charge controller and an inverter. The charge controller is electrically connected to at least one rechargeable battery and at least one photovoltaic panel, and is capable of receiving auxiliary power inputs.

In U.S. Pat. No. 7,938,615, dated May 10 2011, Michaud disclosed an atmospheric vortex engine. A tornado-like convective vortex is produced by admitting air at the base of a cylindrical wall via tangential entry ducts. The heat required to sustain the vortex is provided in peripheral heat exchange means located outside the cylindrical wall. The heat source for the peripheral exchange means can be waste industrial heat or warm sea water. The preferred heat exchange means is a, cross-flow wet cooling tower. The mechanical energy is produced in a plurality of turbines. The air can enter an arena via tangential entries or via an opening at the center of the arena floor. The invention can be used to produce mechanical energy, to reduce the temperature of cooled water or to produce precipitation. The invention includes a circular forced draft cooling tower that can operate in non-vortex mode or in vortex mode.

In U.S. Pat. No. 7,969,133, dated Jun. 28, 2011, Zhaug, et al., disclosed a method for providing maximum power point tracking for an energy generating device using a local buck-boost converter coupled to the device. The method includes operating in a tracking mode, which includes initializing a conversion ratio for the buck-boost converter based on a previous optimum conversion ratio; a device power associated with the initialized conversion ratio is calculated. The conversion ratio is repeatedly modified and a device power associated with each of the modified conversion ratios is calculated. A current optimum conversion ratio for the buck-boost converter is identified based on the calculated device powers; the current optimum conversion ratio corresponds to one of a buck-mode, a boost mode and a buck-boost mode for the buck-boost converter.

In U.S. Pat. No. 7,969,735, dated Jun. 28, 2011, Nakatsu, et al, disclosed a power converter which is capable of minimizing an extent to which the power converter components other than the semiconductor module are thermally affected by the heat originating from the semiconductor module. A casing houses: semiconductor modules constituting a circuit for power conversion; a capacitor electrically connected to the main circuit drive circuits, that provide the main circuit with a drive signal used in power conversion operation; a control circuit that provides the drive circuit with a control signal used to prompt the drive circuit to provide the drive signal, Within the casing, a cooling chamber, including a coolant passage is formed, and a chamber wall of the cooling chamber is formed with a thermally conductive material. At least the semiconductor modules are housed inside the cooling chamber, and at least the capacitor and the control circuit are disposed outside the cooling chamber.

In U.S. Patent Application Publication No. 2010/0244449 dated Sep. 30, 2010, Lee disclosed a solar-based power generator.

The system of this invention incorporates a unique combination of components not found in the foregoing prior art system. The improved efficiency of this combination will become more apparent in the following description and accompanying drawings.

While these solar energy driven systems may be suitable for the purposes for which they were designed, they would not be as suitable for the purposes of the present invention as hereinafter described.

SUMMARY OF THE PRESENT INVENTION

The present invention discloses a solar energy generating system for providing electricity to a structure, e.g., a single family residence. The system comprises a dome-shaped energy collector that receive radiant energy from the sun wherein the rays are magnified and collected on a heat collection head disposed in a collection chamber. A heat transfer unit having inner and outer chambers containing a heat transmission fluid transfers heat to a heat disbursement plate disposed on its distal end remote from the heat collection head, which heat disbursement plate heats water in the boiler to convert the water into super heated steam. The steam is used to drive a steam engine which turns a generator to produce electricity. The electricity is then stored in an electrical energy storage unit being either a plurality of first battery packs for use by the structure or second battery packs for use in system maintenance such as regulating heat in the boiler and returning condensed steam back to the boiler. Furthermore, the electricity generated from the system can go through a switching device or be sold on a conventional power grid. Also, the present invention can be manufactured and sized for any application.

An object of the present invention is to achieve a more efficient operating system for a solar energy generating system by use of a unique combination of components. A further object of the present invention is to provide a solar energy collector that incorporates a movable magnifying means to track the angle of the sun's rays from north to south and to concentrate the rays to a heat collector head; east to west tracking is accomplished by the shape of the collector dome. A further object of the present invention is the use of a specifically designed heat transfer unit to transfer heat from the solar energy collector through a boiler and into a heat disbursement plate at the bottom of the boiler while heating all areas within the boiler. A further object of the present invention is to provide a specifically designed backup water heater system using friction to produce heat to be used in the boiler at night or any other time there are insufficient sun rays.

The foregoing and other objects and advantages will appear from the description to follow. In the description reference is made to the accompanying drawings which form a part hereto, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a solar energy generating system is disclosed and which is generally indicated by reference number 10.

The present invention 10 is directed to a solar energy generating system that uniquely combines plural components that are not known with conventional commercial systems, along with several conventional components that are known and used in such commercial systems.

Figure 1:
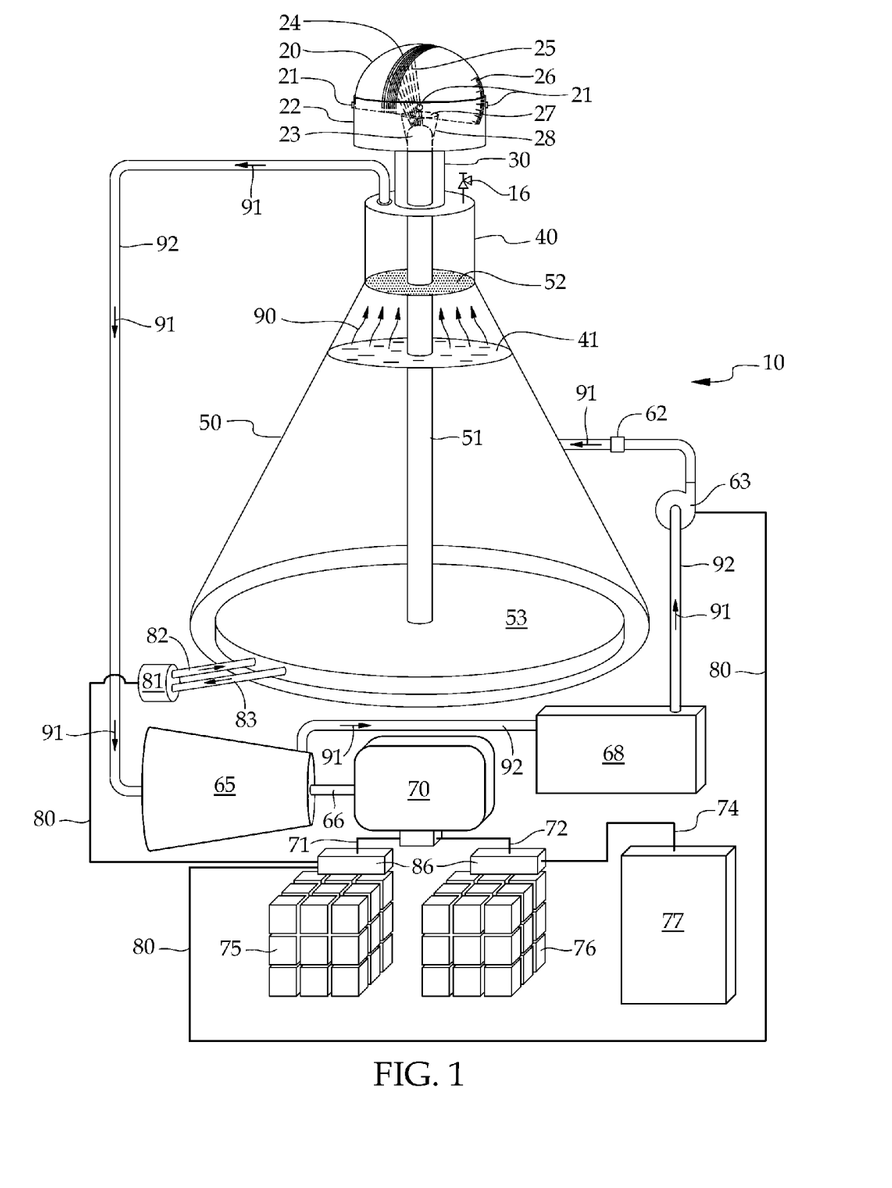
FIG. 1 is a schematic diagram illustrating the preferred solar energy generating system according to the present invention.

The following written description makes reference generally to all the FIGS. 1-7 and may reference specific Figures which will be indicated in the written description. Beginning with FIG. 1, shown therein is the present invention 10 which is a system designed to collect radiant rays 25 from the sun 12 and convert those rays into electricity through an effective and efficient method. There are unique components within the present invention 10 including a solar energy magnifier 24, heat collection chamber 28, heat collector head. 23, heat transfer unit 51, boiler unit 50 and a backup water heater unit 81, all unique to the present invention 10. Other conventional components, to become more apparent hereafter, include a steam engine or steam turbine 65, an electricity generator or alternator 70, two electrical energy storage units which may be in the form of battery storage packs 75, 76 and a power switching system 77 to convert power to be used in a structure or transferred onto a conventional power grid system (not shown).

Figure 2:
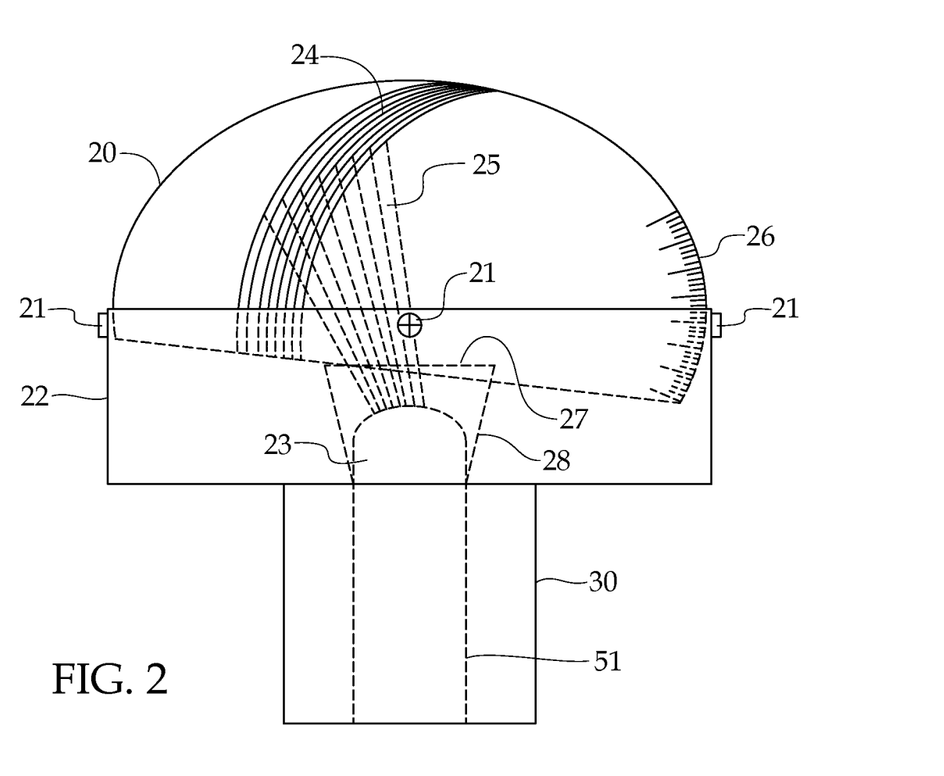
FIG. 2 is an enlarged plan view of the solar energy collector for the system of FIG. 1 showing a dome cover containing a magnifying means and a mobile means to track the sun's rays from north to south and the collection chamber heat collector head and top end of the heat transfer unit.
Figure 3:
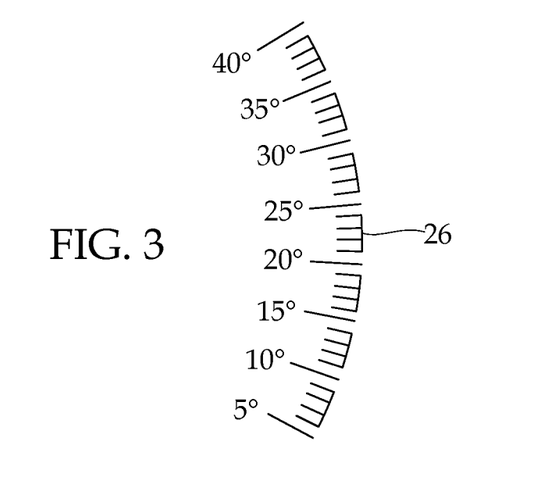
FIG. 3 is an enlarged scale incorporated into the solar energy collector of FIG. 2.

Dome 20 is the solar energy collector used to track the sun 12 without moving, where the dome is hemispherical in shape and is fabricated of a transparent material, such as glass, poly bicarbonate, or plastic, or the like, to allow the sun's rays 25 to pass therethrough to be magnified by a solar energy magnifier 24 and be concentrated at a central location, namely, the collection chamber 28. The dome 20 is disposed in a receptacle-like base 22. The angle indicator 26 of the dome 20, as graphically illustrated in FIG. 3, will be set and the dome held in place using the locks 21 set to the angle of the sun 12 according to the global location of the system. Seasonal adjustments of the angle of the dome 20, manually, or automatically, may be made to maintain the proper angle with respect to the sun 12. The rays 25 of the sun 12 pass through a magnification lens 24, preferable arcuate shaped to pick up the rays 25 over seasonal changes, then through a one-way pass through 27 so that the heat will be contained and restricted within the collection chamber 28.

The collection chamber 28 houses a heat collector head 23 in a position to receive the focused, magnified sun rays 25. The heat collector head 23 is thermally controlled to adjust the temperature to prevent it from overheating. The heat collector head 23 is attached to the top of the heat transfer unit 51, shown enlarged in FIGS. 4 and 7, where a preferred material of construction is corrosion resistant, high heat compatible, with a high heat transfer coefficient, and expected to be manufactured from titanium, stainless steel, copper alloy or the like. It is expected that temperatures in the heat collector head 23 will range from about 500 degrees F to about 1000 degrees F; temperatures above about 1000 degrees F will be prevented (by e.g. unfocusing the solar energy magnifier 24) because higher temperatures may damage portions of the present invention 10, Because a portion/extension of the heat transfer unit 51 may be exposed just below the heat collector head 23, which extension is provided to facilitate structure 97, it is insulated with high density insulating material 30. The extension is expected to be about 18-24 inches long. The lower end of the heat transfer unit 51 is centrally disposed on a heat disbursement plate 53, at the lower end of the boiler 50.

Figure 4:
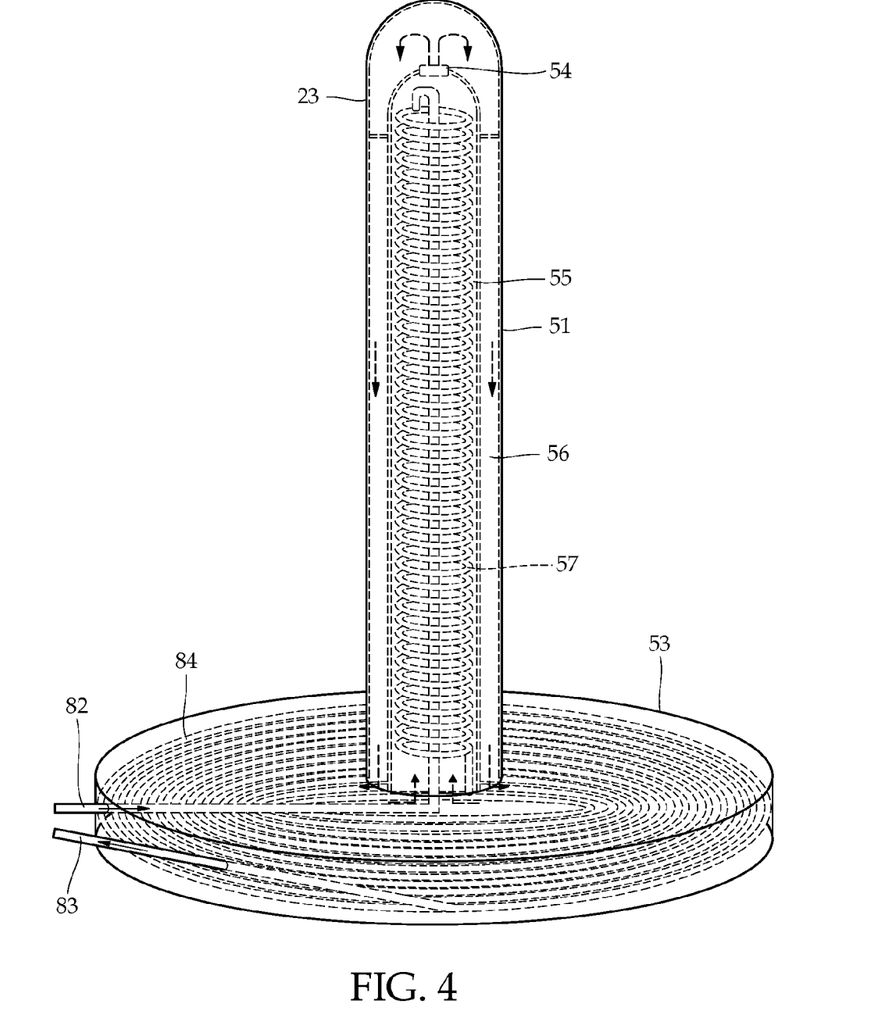
FIG. 4 is an enlarged perspective view of the heat transfer unit forming part of the system of FIG. 1.
Figure 7:
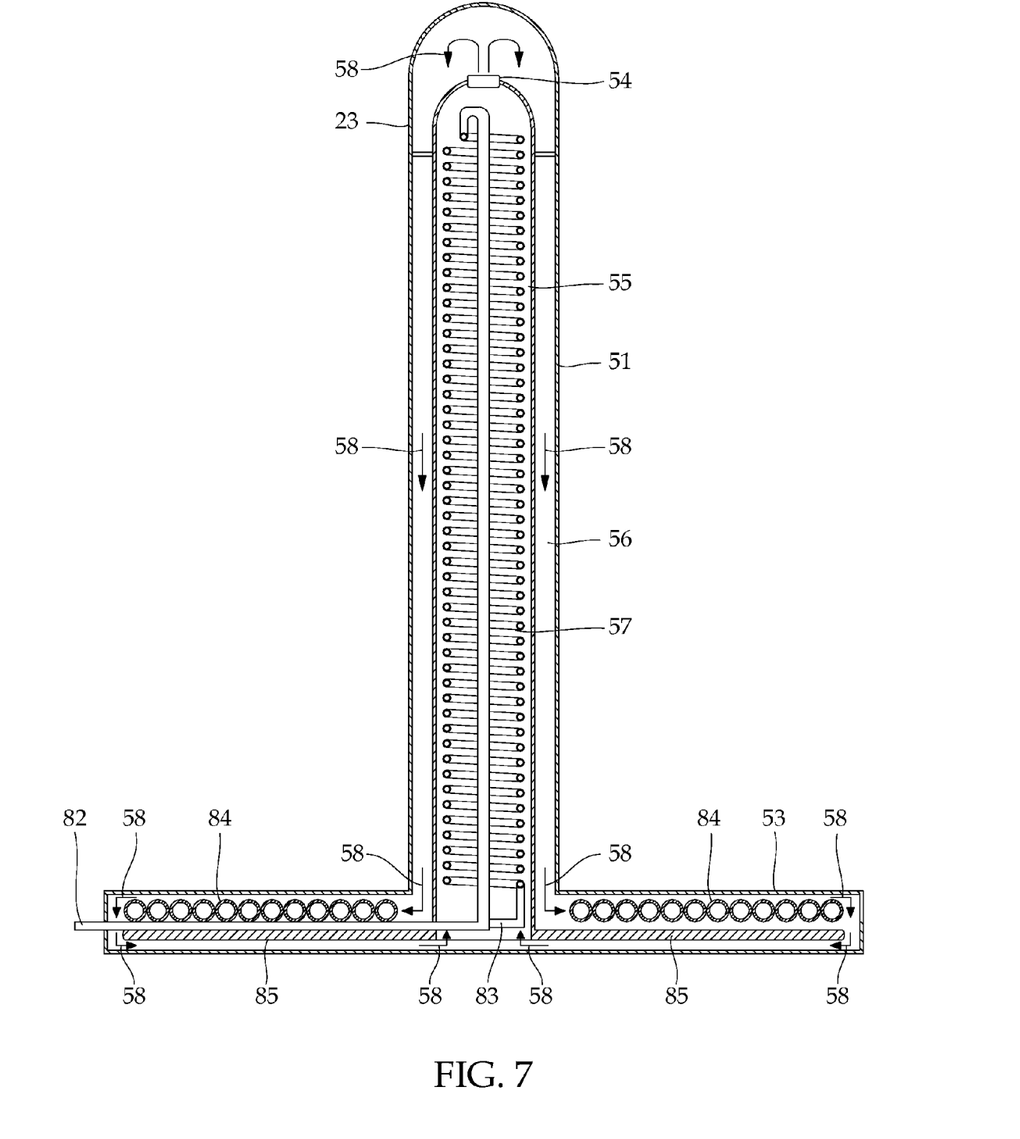
FIG. 7 is a cross-sectional view taken from FIG. 4.

As best seen in FIGS. 4 and 7, the heat transfer unit 51, which is a closed loop system, includes inner and outer chambers 55, 56 filled with heat transfer fluid which may be liquid and/or gas (the flow of which is indicated by arrows 58 on FIGS. 4 and 7), preferable either glycol or cottonseed oil, or the like, for conducting and transferring heat through all areas of the boiler 50 and to the heat disbursement plate 53 in the bottom of the boiler. Since the heat transfer unit 51 is a closed loop system, flow of the heat transfer fluid which may be either liquid and/or gas can be in either direction through the heat disbursement plate 53, where the buildup of pressure in the system, along with the heat, forces the fluid through the chambers 55, 56 and heat disbursement plate 53. A computer controlled valve 54, as known in the art, may be disposed near the top of the heat transfer unit 51 to control the flow direction. The inner and outer chambers 55, 56, which contain heat transfer fluid, act as conduits through which the heat transfer fluid flows, wherein the inner and outer chambers or conduits communicate with, i.e., extends into and through at a portion of, the heat collector head 23, the heat transfer unit 51 and the heat disbursement plate 53 so that the water in the boiler 50 is heated. The heat transfer fluid is expected to have a relatively high boiling point, well above the boiling point of water, and relatively low vapor pressure, e.g. cottonseed oil has a boiling point of about 1,850 degrees Fahrenheit and a vapor pressure of about 5 mmHg, and, the glycol family all have boiling points greater than about 350 degrees Fahrenheit and relatively low vapor pressures.

Heat generated within the heat collector head 23 (best shown in FIGS. 4 and 7) is transferred by way of the heat transfer unit 51 into the boiler 50 to convert water into steam. The heat disbursement plate 53 also works together with the heat transfer unit 51 to heat the water in the boiler 50. When more heat is needed to superheat the steam in the super heat and pressurization chamber 40 the flow of the liquid and/or gas is downward through the outer chamber 56, through the heat disbursement plate 53, around separator plate 85, and up through the inner chamber 55 of the heat transfer unit 51 as illustrated in FIGS. 4 and 7, In a contrary manner, when more heat is needed to heat the water 41 in the boiler 50 to a boiling state, the flow of the liquid and/or gas is reversed so that it is downward (opposite to the condition shown in FIGS. 4 and 7) through the inner chamber 55 into and through the heat disbursement plate 53, around the separator plate 85 shown in FIG. 7, and then up through the outer chamber 56. That is, the system is controlled by computer 79 using valve 54 according to the temperature in the inner chamber 55 and outer chamber 56 of the heat transfer unit 51 by specific user selectable needs within the cone-shaped boiler 50 (see FIGS. 4, 5, and 7).

The heat disbursement plate 53 includes a secondary heat source backup friction water heater 81, or the like, to be used to generate heat during times of the lack of sunshine. Heated mineral water from the backup friction water heater 81 enters the heat disbursement plate 53 through entrance conduit or portal 82 and associated tubing up through the inner chamber 55 and back down through the spiral tubing 57 into the heat disbursement plate 53 to return through circular heater conduit or tubing 84 and conduit or portal 83 to the backup friction water heater 81 to be reheated and used to keep the boiler 50 hot during times of little or no sunshine.

Figure 5:
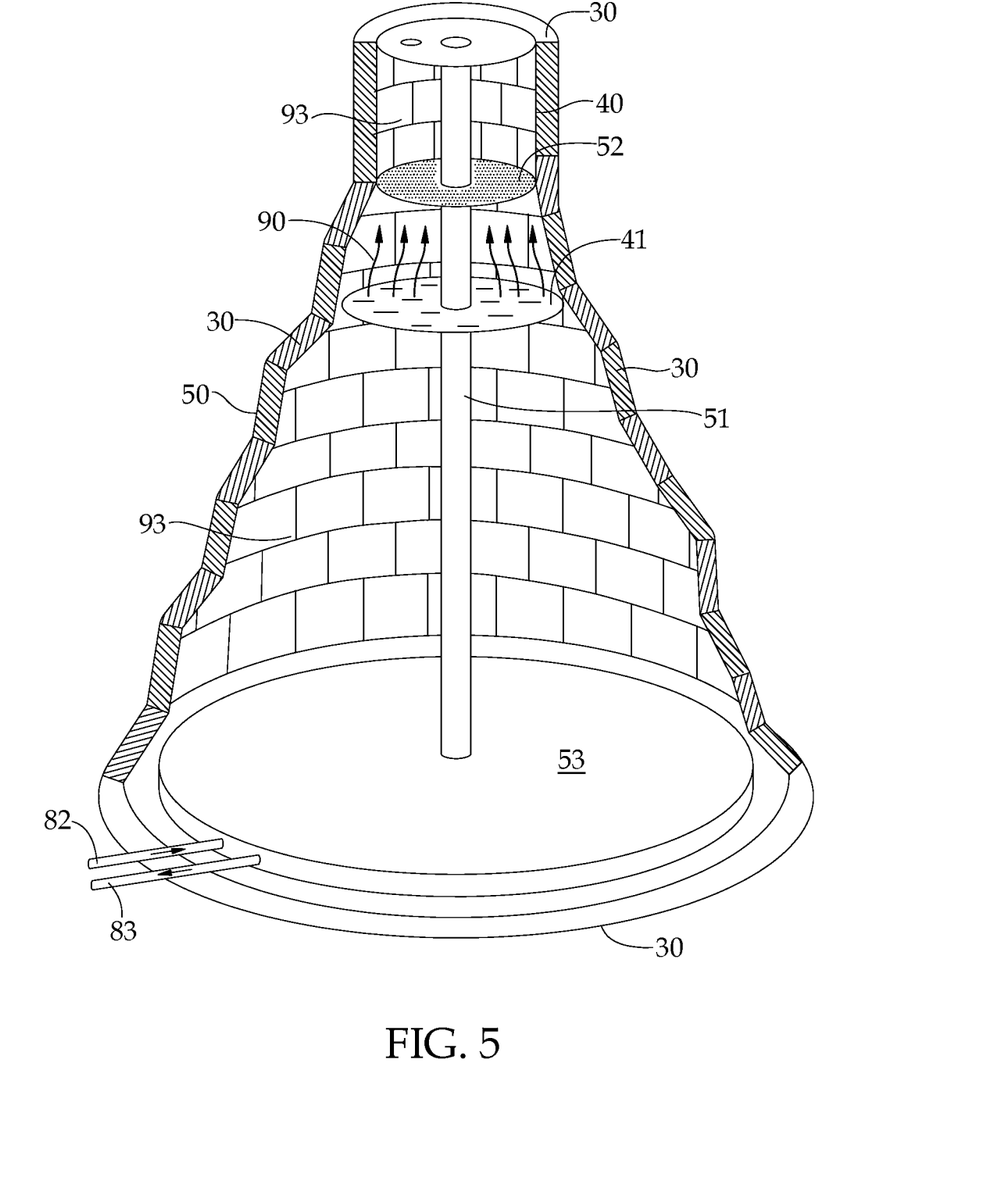
FIG. 5 is an enlarged perspective view of the boiler for incorporation into the system of FIG. 1.

Heat is transferred by way of the heat transfer unit 51 into the boiler 50 to convert water into steam. The boiler unit 50 is enclosed with high density insulating material 30 and lined with reflective tiles or reflective material 93, as best seen in FIG. 5, to evenly magnify and disburse heat from the heat transfer unit 51. The boiler 50 is filled with distilled water or the like to an approximate surface level, illustrated as 41. As the water boils the heated vapors 90 pass through the filtration system 52 to remove residual water allowing only steam to enter the super heat and pressurization chamber 40 to be super heated by means of the upper most portion of the heat transfer unit 51 where the heat transfer unit has the highest temperature and sent through heavily insulated plumbing conduit 92 to the steam engine 65. Temperatures in the heat transfer unit 51 below filter 52 and above the waterline 41 are expected to range from about 212 F to about 300 degrees F; temperatures in the super heat and pressurization chamber 40 are expected to range from about 300 F to about 500 degrees F. Pressure in the upper portion of the boiler 50 in the area where the heated vapors 90 are shown is expected to be about 100 psi. Pressure in the super heat and pressurization chamber 40 is expected to be about 200 psi requiring a pressure relief valve 16 as would be done in the standard manner by one skilled in the art.

As best illustrated in FIG. 1, the plumbing conduit 92 delivers super heated steam from the super heat and pressurization chamber 40 to the steam engine or steam turbine 65 in the direction indicated by the arrows 91. Pressures in the steam engine/turbine 65 is expected to be about 160 to about 200 psi to assure efficient operation. Once steam has passed through the steam engine or steam turbine 65 it goes through a condenser 68. Condensed vapors and/or liquid from the condenser 68 are pumped by means of a pump 63 through a one-way pressure valve 62, then back into the boiler 50 to complete a closed loop system reducing the need for replacement of a large portion of lost liquid, preferably distilled water.

Energy is transferred through drive 66 from the steam engine or steam turbine 65 into the generator 70 where generated electrical energy is passed on through electrical wiring 71 and 72 to junction boxes 86 and to electrical energy storage units which may be in the form of plural battery storage packs 75, 76, preferably two in number, for storage as would be done in the standard manner by one skilled in the art. A first battery storage pack 75 stores electrical energy to be transferred through electrical wiring 80 and used by pump 63 and backup water heater 81 or additional pumps when required. A second battery storage pack 76 stores electrical energy to be transferred through wiring 74 to a main breaker panel and switching device 77 for use in the destination structure, such as a residence, by the end user, or switched onto a conventional power grid (not shown).

Figure 6:
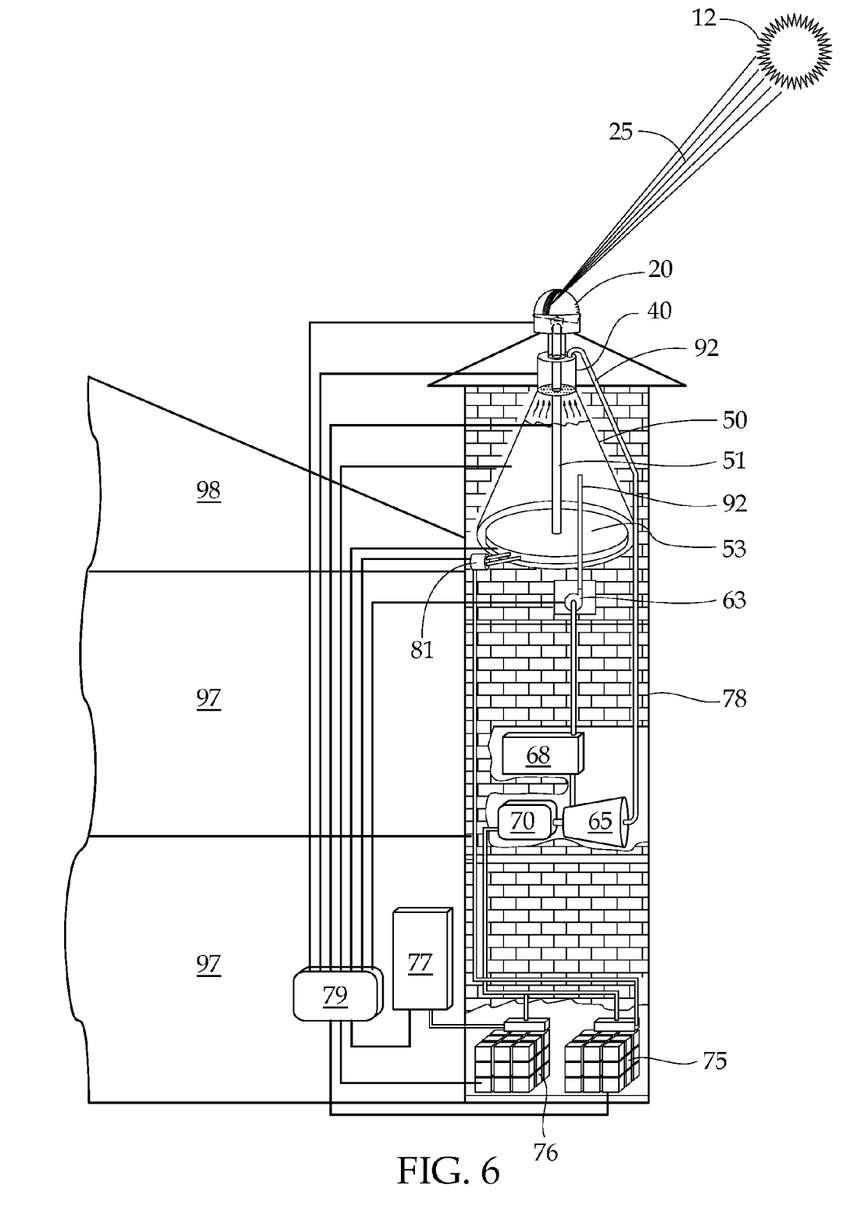
FIG. 6 is a schematic diagram, similar to FIG. 1, further showing the system of the present invention in relation to an exemplary single family home utilizing the system hereof.

Turning to FIG. 6, therein is shown an an example of an application of the present invention to a structure 97, such as a residence, wherein the solar collector 20 is above the roof line 98 to assure it can receive the rays 25 from the sun 12, wherein the flow of solar energy is through the solar collector chamber 28 into the heat transfer unit 51 and then into the boiler 50, where steam exists in the boiler and flows through the plumbing conduit 92 to the steam engine 65. The steam engine 65 converts steam energy into mechanical energy to be used by the power generator 70 to convert it into electrical energy which flows through the electrical wiring 71, 72 into electrical energy storage units which may be in the form of the storage battery packs 75, 76. From there, the electrical energy flows through the electrical wiring 80 to the specifically designed backup water heater 81 or through the electrical conduit 74 to the switching and breaker panel 77 to be used as required by the user or placed on the power grid. FIG. 6 also shows an exemplary single family home 97 utilizing the present invention, with a portion of the present invention, including the solar energy collector 20, exposed on the roof 98 thereof, and the remaining components within the structure 97. Blocks 78, being heat and sound insulators, cover the exterior of the structure 97 housing the present invention. The following items are not actually shown on FIG. 6 but are shown on other FIGS. 28, 71, 72, 80, 92.

Also shown in FIG. 6 is a computer 79 which is used to control the present invention 10 as would be done in the standard manner by one skilled in the art. Computer 79 is expected to be used to control temperatures in the dome 20, heat transfer unit 51, heat disbursement plate 53, super heat and pressurization chamber 40, and the boiler 50. Other components expected to be controlled by computer 79 include the backup water heater unit 81, pump 63, valve 54, electrical energy storage units which may be in the form of battery storage packs 75, 76, and power switching system 77.

It is recognized that changes, variations and modifications may be made to the present invention 10 for a solar energy generating system without departing from the spirit and scope thereof. Accordingly, no limitation is intended to be imposed thereon except as set forth in the accompanying claims.

I claim:

1. A solar energy generator for generating electricity from rays received from the sun, comprising:
    a) a solar energy collector for collecting the rays from the sun, said solar energy collector having an interior;
    b) a solar energy magnifier disposed in said interior of said solar energy collector for magnifying the rays from the sun;
    c) a heat collector head for receiving the magnified rays from the sun;
    d) a boiler, said boiler containing water to be converted into steam, said boiler having an interior for containing said water, said boiler having upper and lower portions;
    e) a super heat and pressurization chamber disposed on said upper portion of said boiler for containing superheated steam;
    f) a heat transfer unit disposed in said boiler, said heat transfer unit having upper and lower end portions, wherein said heat collector head is disposed on said upper end portion of said heat transfer unit, an inner and an outer chamber disposed in said heat transfer unit;
    g) a heat disbursement plate disposed on said lower end portion of said heat transfer unit;
    h) a fluid for transferring heat through said heat collector head, said heat transfer unit and said heat disbursement plate, wherein said fluid is disposed in said inner and outer chamber, wherein said inner and outer chambers communicate with said heat collector head, said heat transfer unit and said heat disbursement plate so that said water in said boiler is heated;
    i) a steam engine adapted to receive steam from said superheat and pressurization chamber for operating said steam engine;
    j) a generator for generating electricity, said generator being driven by said steam engine;
    k) an electrical energy storage unit for storing electricity generated by the generator; and
    l) a condenser, said condenser being in fluid communication with said steam engine and said boiler, wherein said condenser receives steam from said steam engine and returns a portion of the steam back to said boiler.

2. The apparatus of claim 1, further comprising a backup water heater for supplying heat to said boiler during periods of time when the rays from the sun are not available.

3. The apparatus of claim 1, further comprising a pump for pumping steam from said condenser back to said boiler.

4. The apparatus of claim 1, wherein said solar energy collector is fixedly movable so that said solar energy collector can be adjusted to track rays from the sun.

5. The apparatus of claim 1, further comprising a heat collector chamber for housing said heat collector head.

6. The apparatus of claim 1, further comprising a computer for controlling the solar energy generator.

7. The apparatus of claim 1, further comprising a switch for switching electricity from said electrical energy storage unit to a structure which receives electricity from the solar energy generator.

8. A method for generating electricity from rays received from the sun, comprising the steps of:
    a) collecting the rays from the sun;
    b) magnifying the rays from the sun;
    c) providing a heat collector head for receiving the magnified rays from the sun;
    d) providing a boiler containing water in its interior to be converted into steam, the boiler having upper and lower portions;
    e) providing a super heat and pressurization chamber on the upper portion of the boiler for containing superheated steam;
    f) providing a heat transfer unit in the boiler, the heat transfer unit having upper and lower end portions, wherein the heat collector head is disposed on the upper end portion of the heat transfer unit, providing an inner and an outer chamber in the heat transfer unit;
    g) providing a heat disbursement plate on the lower end portion of the heat transfer unit;
    h) providing fluid for transferring heat from the heat collector head to the heat transfer unit and the heat disbursement plate, wherein the fluid is disposed in the inner and outer chambers of the heat transfer unit, wherein the inner and outer chambers communicate with the heat collector head, the heat transfer unit and the heat disbursement plate so that the water in the boiler is heated;
    i) providing a steam engine for receiving steam from the superheat and pressurization chamber for operating the steam engine;
    j) generating electricity using a generator driven by the steam engine;
    k) storing electricity generated by the generator; and
    l) condensing steam from the steam engine and returning a portion of the steam back to the boiler.

9. The method of claim 1, further comprising the step of providing a backup water heater for supplying heat to the boiler during periods of time when the rays from the sun are not available.

10. The method of claim 1, further comprising the step of pumping steam from the condenser back to the boiler.

11. The method of claim 1, further comprising the step of adjusting the solar energy collector to track rays from the sun.

12. The method of claim 1, further comprising the step of providing a heat collector chamber for housing the heat collector head.

13. The method of claim 1, further comprising the step of controlling the solar energy generator by using a computer.

14. The method of claim 1, further comprising the step of switching electricity from the electrical energy storage unit to a structure which receives electricity from the solar energy generator.

\* \* \* \* \*

UNITED STATES PATENT AND TRADEMARK OFFICE
CERTIFICATE OF CORRECTION

| | | |
|---|---|---|
| PATENT NO. | : 9,103,328 B1 | Page 1 of 1 |
| APPLICATION NO. | : 14/036640 | |
| DATED | : August 11, 2015 | |
| INVENTOR(S) | : Richard D. Kilgore | |

It is certified that error appears in the above-identified patent and that said Letters Patent is hereby corrected as shown below:

In the claims,

Claim 9, line 1, "1" should read --8--;

Claim 10, line 1, "1" should read --8--;

Claim 11, line 1, "1" should read --8--;

Claim 12, line 1, "1" should read --8--;

Claim 13, line 1, "1" should read --8--;

Claim 14, line 1, "1" should read --8--.

Signed and Sealed this
First Day of December, 2015

Michelle K. Lee
*Director of the United States Patent and Trademark Office*